Aug. 24, 1954     E. R. SMITH     2,687,044
POWER ACTUATOR WITH PILOT CONTROL
Filed April 6, 1953     2 Sheets-Sheet 1

INVENTOR.
EDWIN R. SMITH.
BY
*Chas. T. Hawley*
ATT'Y.

INVENTOR.
EDWIN R. SMITH
BY Chas. T. Hawley
ATT'Y.

Patented Aug. 24, 1954

2,687,044

UNITED STATES PATENT OFFICE 2,687,044

POWER ACTUATOR WITH PILOT CONTROL

Edwin R. Smith, Seneca Falls, N. Y., assignor to Seneca Falls Machine Company, Seneca Falls, N. Y., a corporation of Massachusetts Application April 6, 1953, Serial No. 346,897

2 Claims. (Cl. 74—388)

This invention relates to a power actuator of the type in which a normally-rotating power or input shaft may be selectively coupled by a relatively small pilot or control device to drive an output shaft during an operative period determined by the control device. Such power actuators may be required for certain special purposes, such as power steering of a boat or automobile, in which provision must be made for alternative manual operation, if the power actuator for any reason becomes inoperative or non-available.

It is the general object of my invention to provide a power actuator or servo-mechanism to be rendered operative by initial movement of a control shaft, together with an available direct actuating connection between the control shaft and the output shaft, for manual use if such initial movement of the control shaft is not productive of the desired results.

More specifically, I provide a yielding lost-motion connection between the control shaft and the output shaft by which the output shaft may be turned manually if the lost-motion is taken up without providing an effective connection between the input and the output shafts.

My invention further relates to arrangements and combinations of parts which will be hereinafter described and more particularly pointed out in the appended claims.

A preferred form of the invention is shown in the drawings, in which

Figure 1:
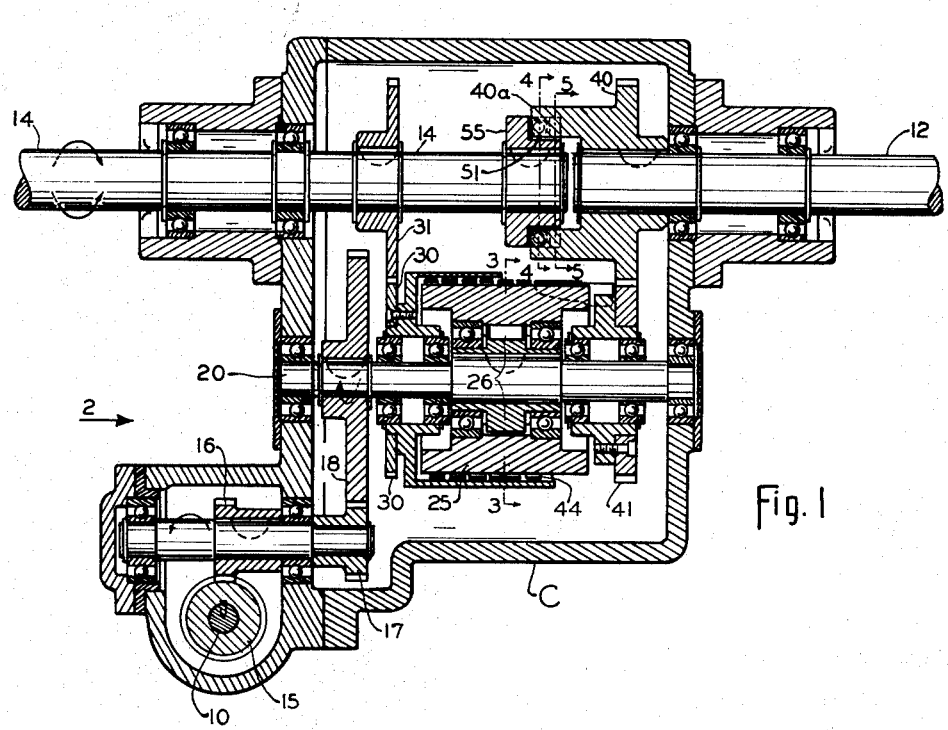
Fig. 1 is a sectional plan view, taken along the irregular section line 1—1 in Fig. 2.
Figure 2:
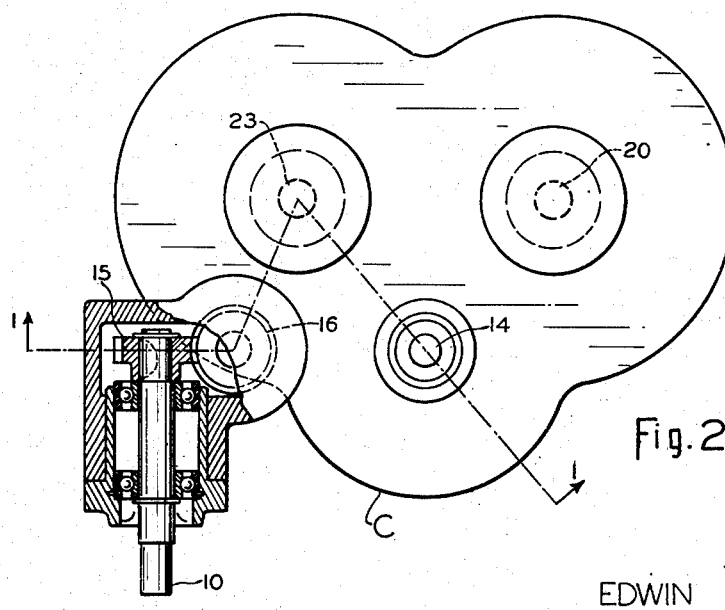
Fig. 2 is an end elevation, looking in the direction of the arrow 2 in Fig. 1.
Figure 3:
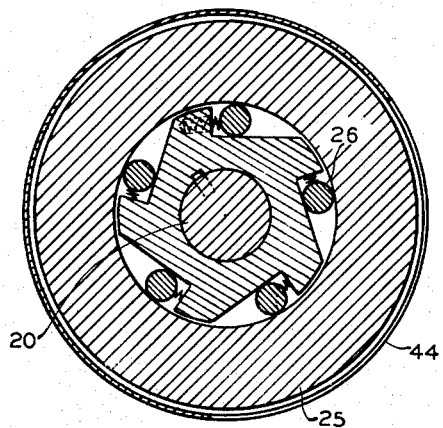
Figure 4:
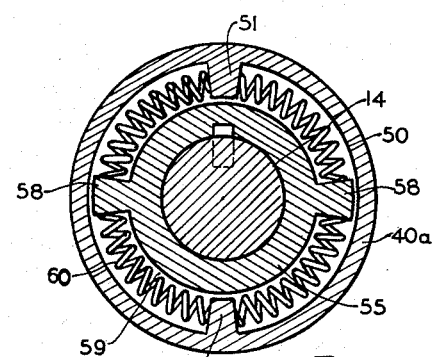
Figure 5:
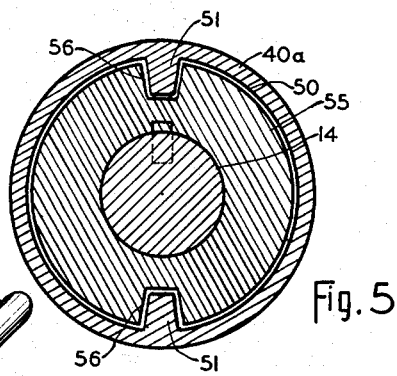
Figure 6:
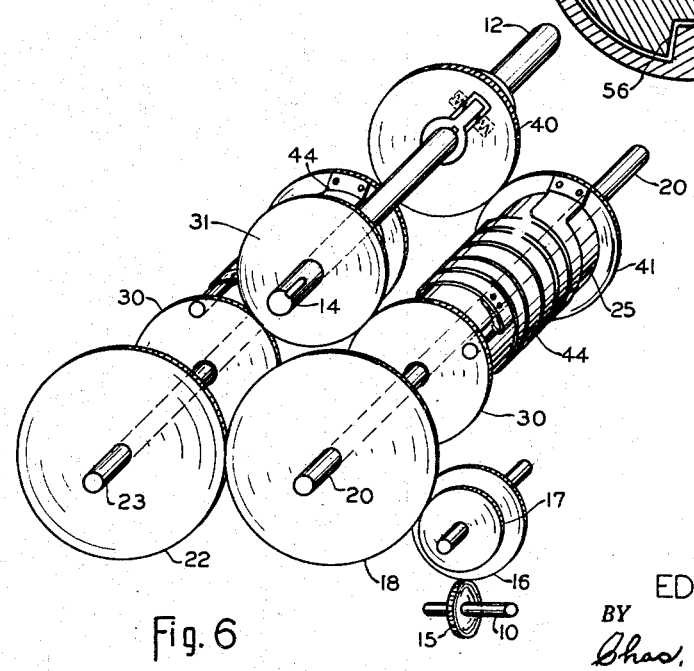

Figs. 3, 4 and 5 are detail sectional views, taken along the lines 3—3, 4—4 and 5—5 in Fig. 1; and Fig. 6 is a perspective view of my improved power actuator but with certain parts omitted for clearness.

Referring to the drawings, I have shown a power actuator which embodies many features of the power actuator shown and described in Small Patent No. 2,569,585, patented October 2, 1951, and owned by the present assignee.

This power actuator comprises a casing C provided with bearings for an input shaft 10, an output shaft 12 and a control shaft 14. The input shaft 10 is continuously rotated, and operates through spiral gears 15 and 16, a pinion 17 (Fig. 1) and a gear 18 to continuously rotate a shaft 20. The gear 18 also engages and oppositely rotates an equal gear 22 (Fig. 6) on a parallel shaft 23 corresponding to the shaft 20 above named.

A drum 25 (Fig. 1) is loosely mounted on the shaft 20 and is connected thereto by a roll-away clutch 26 (Fig. 3). A gear 30 is also loosely mounted on the shaft 20 and engages a gear 31 fixed on the control shaft 14.

A gear 40 (Fig. 1) is fixed to the output shaft 12 and engages an equal gear 41 loose on the shaft 20. A spiral band 44 (Fig. 6) is connected at one end to the gear 30 previously described and at its opposite end to a part associated with the gear 41.

If the gear 30 is rotated by any movement of the control shaft 14, the band 44 will be tightened on the continuously-rotated drum 25, and the output shaft 12 will then be rotated through the band 44 and gears 40 and 41 until the band 44 is loosened by such rotation.

The foregoing description of the driving connection through the gear 18 and shaft 20 (Fig. 6) applies equally to the identical but reversely-disposed driving connection through the gear 22 and shaft 23. The direction of rotation of the output shaft 12 corresponds to the direction of rotation of the control shaft 14, when the control shaft is displaced in either direction.

For a more detailed description of the construction and operation of the mechanism thus far described, reference is made to the Small patent previously identified.

The shafts 12 and 14 are aligned as shown in Fig. 1 but are only connected through a yielding coupling best shown in Figs. 1, 4 and 5.

The hub portion 40a of the gear 40 on the output shaft 12 is recessed at 59 (Fig. 5) and is provided with oppositely-disposed and inwardly-projecting lugs 51. A coupling member 55 is mounted on the control shaft 14 (Fig. 5) which also supports the gear 31, and the member 55 extends loosely into the recess 50 in the hub 40a. The member 55 has oppositely-disposed recesses 56 which loosely receive the lugs 51 on the hub 40a but with a predetermined amount of lost-motion.

The coupling member 55 is also provided with oppositely-disposed lugs 58 and with segmental recesses 59 to receive short coil springs 60. Each spring 60 engages a lug 58 at one end and a lug 51 at the opposite end as clearly shown in Fig. 4, and the joint action of the four springs normally centers the lugs 51 in the recesses 56 as shown in Fig. 5.

With this construction, a slight movement of the control shaft 14 in either direction is permitted by the yielding lost-motion connection before a direct connection between the control shafts 14 and the output shaft 12 can be established. This slight movement tightens the band 44 by the action of the gears 31 and 30, and power is then transmitted from the input shaft 10 through the gears 41 and 40 to the output shaft 12.

If, however, the limited lost-motion available between the coupling member 55 and the hub 40a does not establish a driving connection through the spring 44 to the input shaft 10, then the output shaft 12 may be turned directly by continued manual application of power to the control shaft 14. Such alternative operation is particularly desirable where the output shaft 12 connects to the steering mechanism for a boat or automobile which absolutely must respond to movement of the control shaft 14, as this shaft would commonly be direct connected to the steering wheel.

The roller clutches 26 are provided so that the drums 25 will be free of the shaft 20 or 23 whenever a shaft is rotated backward during a drive through the opposite drum unit.

I have thus provided a simple power actuator capable of general application but having exceptional advantages under certain special conditions. I also provide an actuator in which the output shaft may be directly rotated from the control shaft at any time and without any shifting of connections or any delay in operation.

Having thus described my invention and the advantages thereof, I do not wish to be limited to the details herein disclosed, otherwise than as set forth in the claims, but what I claim is:

1. In a power actuator, a control shaft, an output shaft aligned therewith, a limited lost-motion connection between said shafts, a power shaft, means to rotate said power shaft in one direction only, a servo-connection between said power shaft and said output shaft which includes a countershaft, a gear fixed thereon, a gear loose thereon and connected to drive said output shaft, a drum loose on said countershaft, a one-way clutch for said drum, a helical spring encircling said drum and having one end secured to said loose gear, and a spring-tightening connection from said control shaft to the opposite end of said spring, and said clutch normally rotating said drum with said countershaft but permitting said drum to be rotated freely on said shaft when independently turned ahead more rapidly than said shaft is rotated.

2. In a power actuator, a control shaft, an output shaft aligned therewith, a limited lost-motion connection between said shafts, a power shaft, means to rotate said power shaft in one direction only, a servo-connection between said power shaft and said output shaft which includes two countershafts, a gear fixed to each countershaft, a gear loose on each countershaft and connected to rotate said output shaft in opposite directions, a drum loose on each countershaft, oppositely-disposed one-way clutches for said drums, oppositely-wound helical springs encircling said drums and each having one end secured to the associated loose gear, and a spring-tightening connection from the other end of each spring to the control shaft, and said clutches normally rotating said drums with said countershafts but permitting each drum to be rotated freely on its shaft when independently turned ahead more rapidly than said shaft is rotated.

References Cited in the file of this patent

UNITED STATES PATENTS

| Number | Name | Date |
| --- | --- | --- |
| Re. 23,550 | Staude | Sept. 9, 1952 |
| Re. 23,673 | Penrose | June 30, 1953 |
| 2,569,585 | Small | Oct. 2, 1951 |
| 2,569,586 | Small | Oct. 2, 1951 |